No. 715,775. Patented Dec. 16, 1902.
H. R. FENNER.
CHAIN MACHINE.
(Application filed Jan. 18, 1902.)
(No Model.) 5 Sheets—Sheet 1.
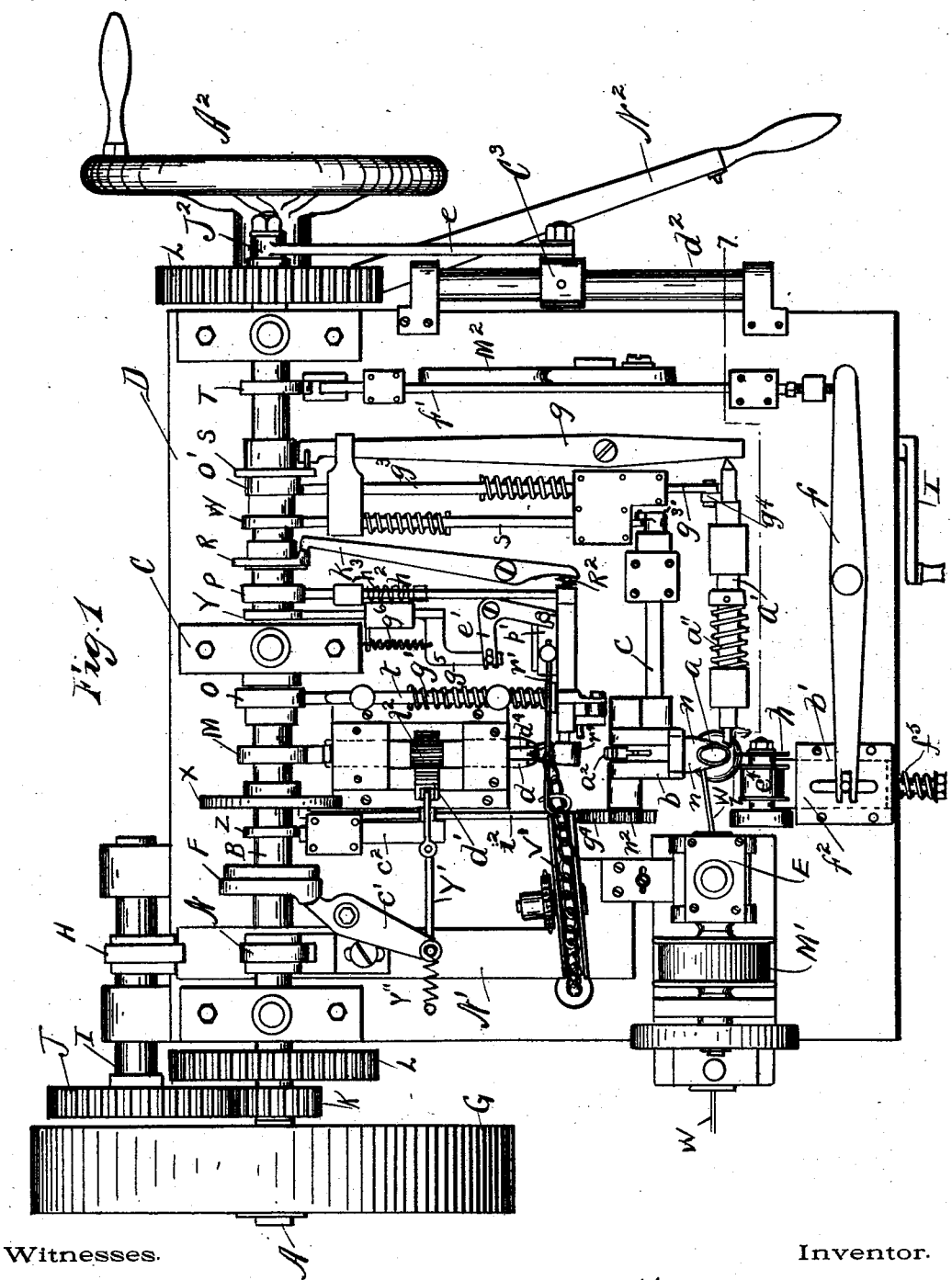
Witnesses.
B. E. Barlow,
M. L. Hazard.
Inventor.
Horace R. Fenner.
By Arnold & Barlow,
Attorneys

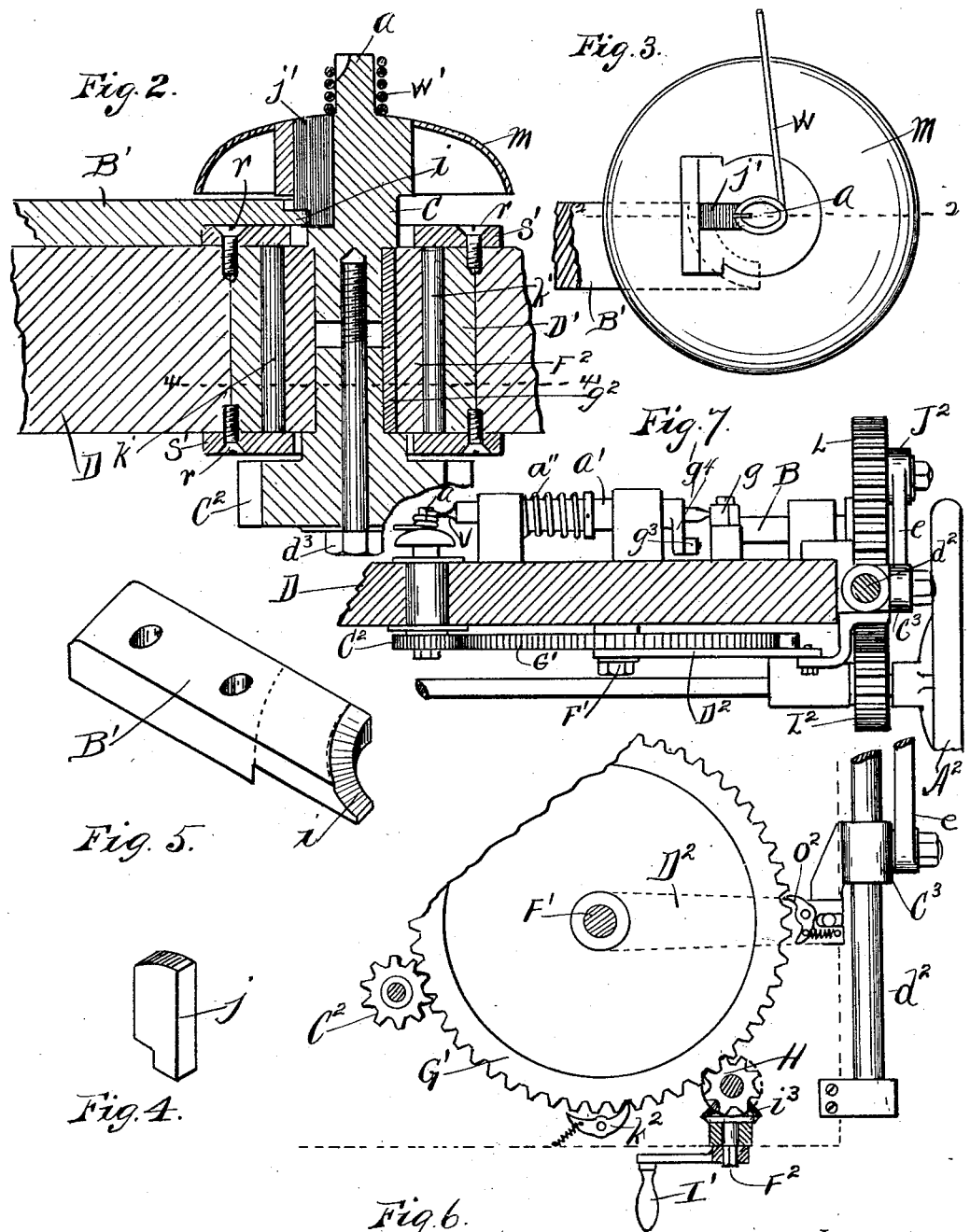

No. 715,775. Patented Dec. 16, 1902.
H. R. FENNER.
CHAIN MACHINE.
(Application filed Jan. 18, 1902.)
(No Model.) 5 Sheets—Sheet 3.
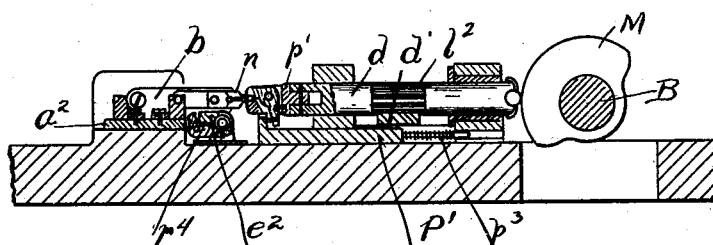
Fig. 8.
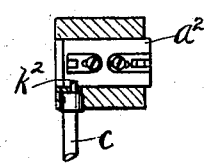
Fig. 9.
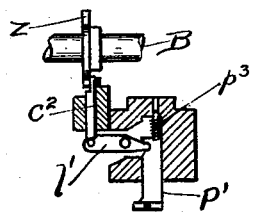
Fig. 10.
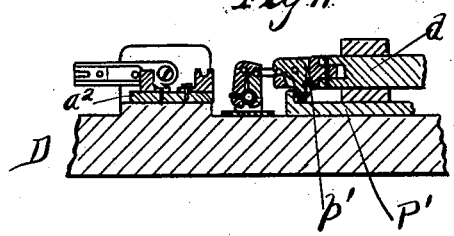
Fig. 11.
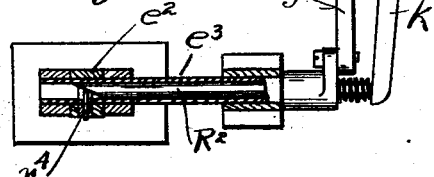
Fig. 12.
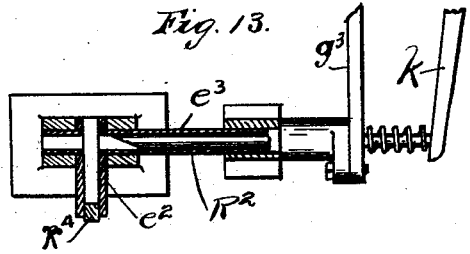
Fig. 13.
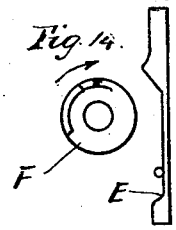
Fig. 14. Fig. 15.
Fig. 16. Fig. 17. Fig. 18. Fig. 19. Fig. 20. Fig. 21.
Fig. 22. Fig. 23. Fig. 24. Fig. 25. Fig. 26. Fig. 27. Fig. 28.
Fig. 29.
Witnesses.
B. E. Barlow,
M. L. Hazard.
Inventor.
Horace R. Fenner
By Arnold H. Barlow,
Attorneys
THE NORRIS PETERS CO., PHOTO-LITHO., WASHINGTON, D. C.

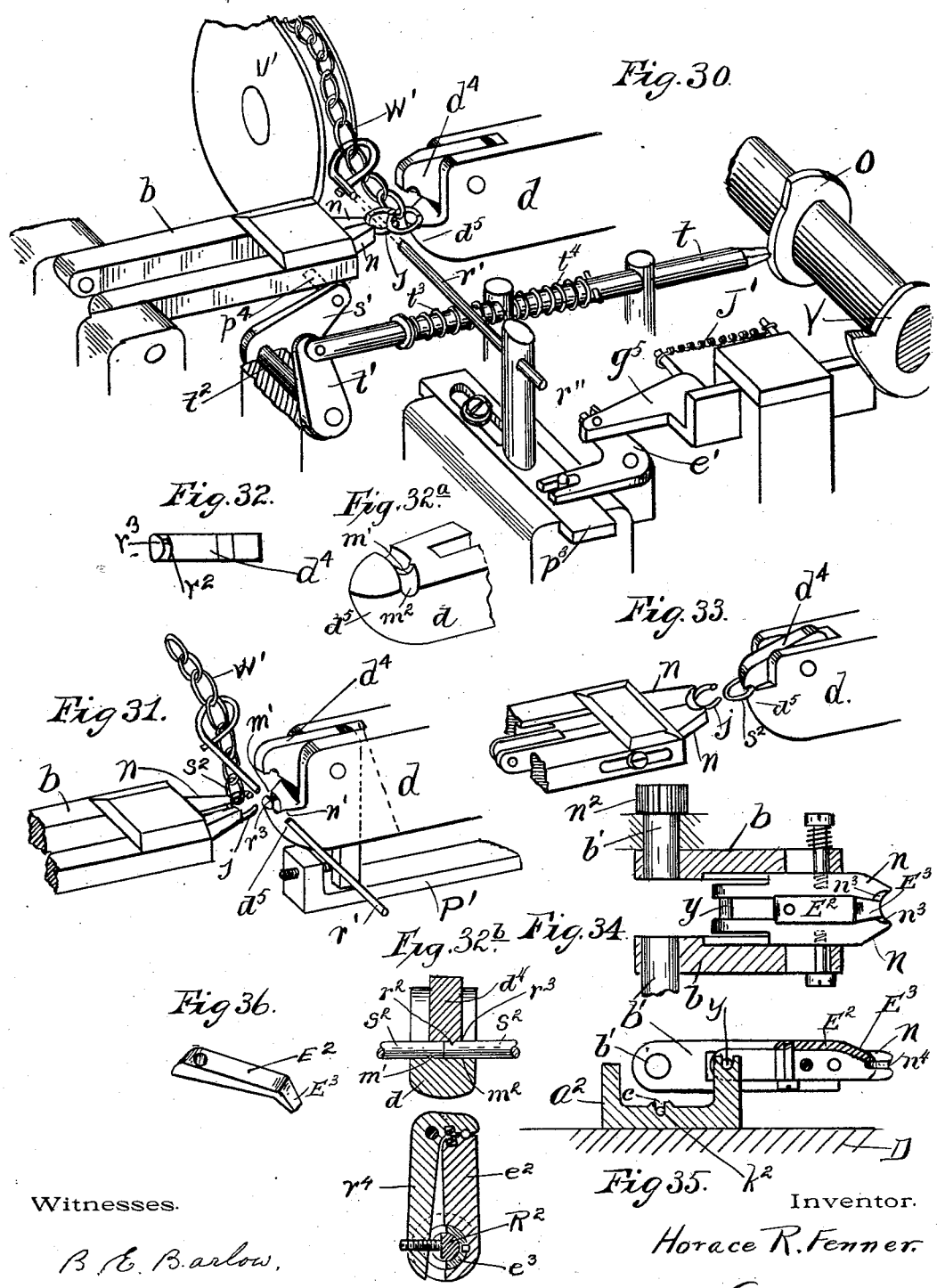

No. 715,775. Patented Dec. 16, 1902.
H. R. FENNER.
CHAIN MACHINE.
(Application filed Jan. 18, 1902.)
(No Model.) 5 Sheets—Sheet 5.
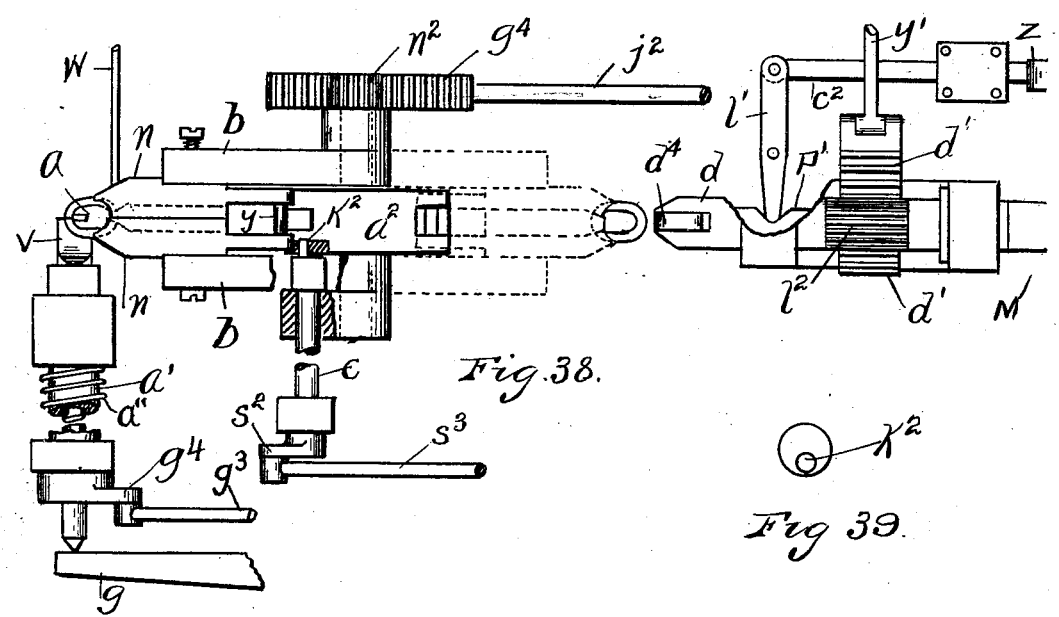
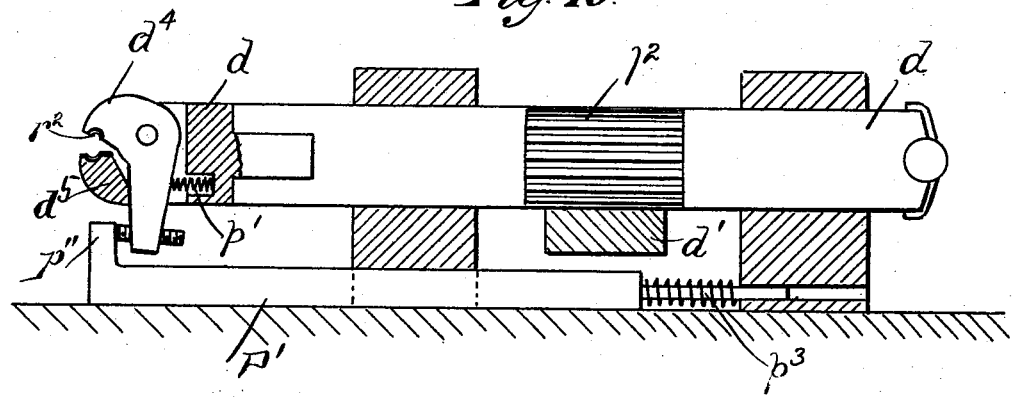
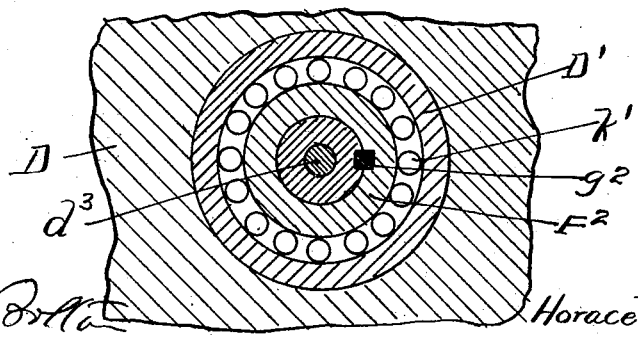
Witnesses Inventor.
Horace R. Fenner.
By Arnold Barber.
Attorneys

UNITED STATES PATENT OFFICE.

HORACE R. FENNER, OF PROVIDENCE, RHODE ISLAND, ASSIGNOR TO REGNELL, BIGNEY & CO., OF ATTLEBORO, MASSACHUSETTS, A FIRM.

CHAIN-MACHINE.

SPECIFICATION forming part of Letters Patent No. 715,775, dated December 16, 1902.

Application filed January 18, 1902. Serial No. 90,298. (No model.)

*To all whom it may concern:*

Be it known that I, HORACE R. FENNER, a resident of Providence, in the county of Providence and State of Rhode Island, have invented certain new and useful Improvements in Chain-Machines; and I do hereby declare that the following is a full, clear, and exact description thereof, reference being had to the accompanying drawings, and to the letters of reference marked thereon, which form a part of this specification.

This invention relates to machines for making chains from wire or rod.

It specially relates to the production of chains having twisted links.

The object of the invention is to provide in such machines improved mechanism for forming the link from the wire, improved mechanism for removing the link just formed from the supporting-jaws, and also to improvements in the jaws that support the link at its meeting ends while the link is being twisted.

With these objects in view and others my invention includes the combination and arrangement of parts, substantially as hereinafter described with reference to the accompanying drawings and then particularly pointed out in the claims.

In the accompanying drawings, representing a machine embodying my invention, Figure 1 is a plan view of the machine. Fig. 2 is an enlarged section on the line 2 2 of Fig. 3, showing the mandrel on which the link is formed and connected parts. Fig. 3 is an enlarged top view of the mandrel on which the link is formed. Fig. 4 shows the bolt that raises the coils on the mandrel. Fig. 5 shows the incline that raises the sliding bolt. Fig. 6 represents the mechanism for rotating the link-forming mandrel. Fig. 7 is a section on the line 7 7 of Fig. 1. Fig. 8 shows the mechanism for delivering the link from the mandrel and adjacent mechanism. Fig. 9 is a detail view of the transferring-jaws. Fig. 10 is a detail view of the mechanism for closing the twisting-jaws. Fig. 11 shows a sectional view of the transferring-jaws and the twisting-jaws. Figs. 12 and 13 show in different positions part of the mechanism for operating the jaws that hold the link while being twisted. Figs. 14 to 28, inclusive, show the cams that operate various mechanism of the machine. Fig. 29 shows in side elevation a lever for operating the saw by hand with adjacent parts. Fig. 30 is an enlarged perspective of the mechanism for joining the links and closing them. Fig. 31 shows a portion of the mechanism shown in Fig. 30, with some parts in different positions. Fig. 32 is a view of the under side of the upper closing jaw. Fig. $32^a$ is a perspective view of the lower twisting-jaw. Fig. $32^b$ is a vertical section through the twisting-jaws, the link being shown in perspective. Fig. 33 shows some of the mechanism for attaching a new link to one previously formed. Fig. 34 shows the under side of the clamping-jaws and spring. Fig. 35 is a vertical section of parts shown in Fig. 34. Fig. 36 represents the spring of the clamping-jaws. Fig. 37 is a section of the clamping-jaws. Fig. 38 is an enlarged plan view of the transferring-jaws and their operating mechanism. Fig. 39 shows the crank that serves to reciprocate the transferring-jaws. Fig. 40 is an enlarged elevation, partly in section, of the twisting-jaws. Fig. 41 is a horizontal section on the line 41 41 of Fig. 3.

Referring now to the accompanying drawings, in which the reference characters indicate the same parts in the several views, D is the table or base of the machine, on which is mounted a main shaft A, supported by bearings C. A cam-shaft B is driven from the main shaft A by gears L $L^2$, as shown in Figs. 1 and 7.

The wire $w$, from which the chain is made, may pass through a suitable marker E and is then wound on a mandrel $a$ on the upper end of a mandrel-holder C', that rotates in a suitable bearing D'. The mandrel-holder C' has an upper and lower portion connected by a bolt $d^3$ and a sleeve $F^2$, as shown in Figs. 2 and 41. A spline $g^2$ connects the portions of the mandrel-holder rotatably. Friction-rolls $h'$ are interposed between the collar $F^2$ and the bearing D', which bearing is secured to the table D by rings S' and screws V'. The mandrel-holder C' is driven by means of a gear $C^2$ on its lower end that engages a gear G', mounted on a stud F', secured to the table. A hub $C^3$ slides on a rod $d^2$, secured to the side of the machine, which hub carries a double ratchet $o^2$, that engages the gear G' and serves to rotate the latter intermittently when the hub $C^3$ is reciprocated by means of the pitman $e$ and crank-pin $J^2$ on the gear L', as shown best in Figs. 1 and 6. A stationary pawl $k^2$ prevents reverse movement of the gear G'.

The above-described mechanisms for rotating the mandrel $a$ are so proportioned that the latter will be given one revolution for each reciprocation of the pitman $e$.

When in starting the machine or for any other reason it is desired to rotate the gear G' and the other parts of the machine, I have provided a gear H, engaging the gear G', and a pinion $F^2$, having a beveled gear $i^3$, that engages a beveled gear connected with the gear H, serves to rotate the latter through the medium of a detachable handle I'.

As each winding is removed from the mandrel $a$, by means hereinafter set forth, the coil of wire thereon is advanced on the mandrel by a sliding bolt $j'$. (See Figs. 2 and 4.) The top of this bolt is normally flush with the top or shell $m$ of the mandrel-holder; but at a certain part of its revolution the lower end of the bolt engages an incline $i$ of a block B' and is thereby moved upwardly adjacent the mandrel $a$, thus raising the coil on the mandrel. As soon as the bolt has passed over this incline it is pushed downward by the incoming wire and resumes its former position. The upper convolution of the coil on the mandrel $a$ is separated from the adjacent one by the flattened extremity V of a shaft $a'$, that is moved toward the arbor by a lever $g$, rocked by cam S on the shaft B. The shaft $a'$ is then slightly rocked by a rod $g^3$ and crank $g^4$ through the medium of the cam O'. Thereupon the shaft $a'$ is moved in the other direction by the spring $a''$.

The end portion $n^3$ of the jaws $n$ converge inwardly and contain grooves $n^4$. A stiff spring $E^2$ is secured to the jaws $n$ and has its free extremity $E^3$ bent downward into alinement with the grooves $n^4$ and serves to retain a link in the grooves of the jaws. The next step is to cut off the end convolution to form the link; but in order to support the link when severed the pair of jaws $n$ $n$ are advanced in their supporting-arms $b$ $b$ toward the wire and firmly hold the end of the coil by the pressure of a very stiff spring $E^2$. (See Figs. 34 and 36.) The jaws $n$ are moved in their supporting-arms $b$ by a slide $a^2$, that has a slot in an upturned portion, whose walls engage a pin $y$, connecting the jaws. A shaft $c$ has a crank $k'$, carrying a pin engaging the walls of a slot in a slide $a^2$. When the shaft $c$ is rocked by a crank $S^2$ and lever $S^3$ and cam W, the slide will be reciprocated. When the jaws $n$ $n$ have been thus moved forward and grasp the end of the coil, a slide $f^2$, carrying a saw $h$, driven by a belt (not shown) on a pulley $e^4$, is moved toward the link by the levers $f f'$ and cam T, whereby the end winding on the mandrel is severed, thus forming a link. The saw-slide is then retracted by coil-spring $f^5$. The next operation is to transfer this open link $j$ to the position in which it is shown in Fig. 33 in order to close on a link $s^2$, previously formed and held in a pair of jaws $d^4$ $d^5$. The arms $b$ are supported on pins $b'$, to one of which is secured a gear $n^2$, that is rocked by a rack $g^4$, secured to a rod $j^2$, operated by a cam X, as shown in Figs. 1 and 38. These latter parts will rotate the arms $b$ through half a revolution and bring the open link $j$ opposite the said link $s^2$. Thereupon the jaws $n$ are reciprocated by the slide $a^2$, and the link $j$ thereby has its open ends moved onto the link $s^2$. A slide $d$ is moved forward by a cam M. A jaw $d^4$ is pivoted to the slide $d$ and coöperates with the jaw portion $d^5$ of the slide. The link-engaging face of the upper jaw $d^4$ has a groove $r^3$ therein, containing a ridge $r^2$. The lower jaw $d^5$ has a groove $m^2$, that contains a ridge $m'$. The margin of the grooves $r^3$ and $m^2$ register when the jaws are in close proximity. A coil-spring $p'$ serves to normally hold the jaws separated. A slide P' is moved in one direction by a lever $l'$, rod $c^2$, and cam Z on the cam-shaft and is moved in the other direction by a coil-spring $p^3$. A lug P'' on the slide P' engages the lower end of the jaw $d^4$, and thereby rocks the jaw $d^4$ when the slide is reciprocated, and which parts will also serve to retract the slide $d$. When the link $j$ has been hooked on the previously-formed hook $s^2$, a rod $r'$, that has one end looped around the chain $w'$, and the jaws $d^4$ $d^5$ being separated, the wire is moved to the position shown in Fig. 31, which will draw up the chain, that is passed over a pulley V from the position shown in Fig. 30 to that shown in Fig. 31, and the link $s^2$ will be drawn out of the jaws. The rod $r'$ is supported on a post $r''$, mounted on a slide $P^3$, that is reciprocated through an angle-lever $e'$, sliding plate $g^5$, and cam Y. At this stage of the operation the arms $b$ are raised slightly by a pin $p^4$ on an arm $s'$, which, together with an arm $t'$, are mounted on a rock-shaft $t^2$, that is rocked by rod $t$ and cam O, the rod being controlled by springs $t^3$ and $t^4$. The object of thus raising the link is to permit it to pass between the jaws $d^4$ and $d^5$, that are thereupon advanced toward the link by the slide $d$, and then the slide P' is retracted, causing the upper jaw $d^4$ to close onto the link and force its open ends together, as shown in Fig. 32$^b$. The link being securely held in the grooves $r^3$ and $m^2$, the ridge $r^2$ engaging one extremity of the link and the ridge $m'$ engaging the other extremity of the link will effectually prevent the ends from separating. As soon as the link is grasped by the latter jaws the transferring-jaws $n$ $n$ are moved away from the link by the slide $a^2$, and then the arms $b$ carry the jaws $n$ back to their former position to operate on the next link to be taken from the coil on the mandrel $a$. The now closed link held in the jaws $d^4$ $d^5$ is next engaged by holding-jaws $e^2$ and $r^4$, mounted on a tubular shaft $e^8$, that has a crank $e^4$ connected to a rod $h^2$. This rod is reciprocated by a cam P and spring $h^3$. These holding-jaws normally in the position shown in Fig. 8 are now moved by the rod $h^2$ and shaft $e^3$ to the position shown in Fig. 11 and engage the free end of the link between their now open jaws. A rod $R^2$, having a beveled end, is now moved in the shaft $e^3$ by lever $k$ and cam R, which causes the jaws to close onto the link. Thereupon the slide $d$ is given a slight rotation by means of its pinion $l^2$ engaging a rack $d'$ on an arm $y'$, that is operated by a lever $c'$, cam F, and spring $y$. This rotation of the slide $d$ and its connected jaws will cause the link held in the latter to be given a slight twist. The ridges $r^2$ and $m'$, as shown in Fig. 32$^b$, will effectually prevent the meeting ends of the link from separating during this twisting operation. Immediately thereupon the reverse movement of the rod $R^2$ causes the link to be released from the holding-jaws $e^2$ $r^4$, and the latter are then returned to their normal position. (Shown in Fig. 8.) Then the reverse movement of the rack $d'$ will return the jaws $d^4$ $d^5$ to their former position and the finished link will be ready to have another link formed by the cycle of operations, as above described, and closed on it.

A hand-lever $M^2$ is pivoted to the lever $f'$ and has its lower end arranged to engage a lug $P^2$ on the table, whereby when the handle is operated it will cause the levers $f'$ and $f$ to advance the saw-slide and sever any imperfect links that might be formed on starting the machine.

When a first link has been formed and is held in the jaws $d^4$ $d^5$, a piece of chain or cord is secured to it and passed over the wheel V' and has a weight attached to its free end.

Having thus described my invention, what I claim is—

1. In a chain-machine, the combination of a rotatable winding-mandrel having a flange portion; a slidable bolt having its extremity normally flush with the flange portion, and arranged to be moved therefrom with one side in close proximity to the mandrel and thereby advance a coil on the mandrel longitudinally thereon; and means for sliding the bolt at a certain part of the rotation of the mandrel.

2. In a chain-machine, the combination of a rotatable winding-mandrel having a flange portion; a slidable bolt having its extremity normally flush with the flange portion and arranged to be moved therefrom with one side in close proximity to the mandrel and thereby advance a coil on the mandrel longitudinally thereon; and a stationary block having a cam-surface arranged to engage the other end of the bolt and cause it to advance a coil on the mandrel.

3. In a chain-machine, the combination of the jaws $n$, $n$, having the converging end faces $n^3$, $n^3$, and the grooves $n^4$, $n^4$, in said end faces; and the spring $E^2$, secured to the jaws and having a bent portion at its extremity located between the slot portion of the jaws, substantially as described.

4. In a chain-machine, the combination with the holding-jaws; the closing jaws and the guide-pulley arranged to receive the chain as formed; of a hook member arranged to loosely engage the chain between the jaws and said guide; and means for moving the hook member to draw the chain upwardly and thereby withdraw a finished link from the closing jaws.

5. In a chain-machine, the combination of a pair of jaws; each having a curved groove in its gripping-face, the grooves being located in apposition; each jaw having a ridge in its grooved portion.

6. In a chain-machine, the combination of a pair of jaws; each having a curved groove in its gripping-face, the grooves being located in apposition; each jaw having a ridge in its grooved portion, which are located on opposite sides of the middle part of the groove.

In testimony whereof I have hereunto set my hand this 20th day of December, A. D. 1901.

HORACE R. FENNER.

In presence of—
 HOWARD E. BARLOW,
 BENJ. ARNOLD.